(12) United States Patent
Katoh

(10) Patent No.: US 8,195,969 B2
(45) Date of Patent: Jun. 5, 2012

(54) ELECTRONIC EQUIPMENT, IMAGE FORMING APPARATUS, STARTING METHOD OF ELECTRONIC EQUIPMENT, AND COMPUTER PROGRAM PRODUCT

(75) Inventor: Katsuhiko Katoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 395 days.

(21) Appl. No.: 12/474,854

(22) Filed: May 29, 2009

(65) Prior Publication Data
US 2009/0307480 A1 Dec. 10, 2009

(30) Foreign Application Priority Data
Jun. 6, 2008 (JP) ................................. 2008-149334

(51) Int. Cl.
*G06F 15/177* (2006.01)
(52) U.S. Cl. ................ 713/320; 713/1; 713/2; 713/300; 713/310; 713/321; 713/322; 713/323; 713/324; 713/330; 713/340
(58) Field of Classification Search .................. 713/1, 2, 713/300, 310, 320–324, 330, 340
See application file for complete search history.

(56) References Cited

U.S. PATENT DOCUMENTS

| | | | |
|---|---|---|---|
| 6,412,068 B1* | 6/2002 | Nolan et al. | 713/1 |
| 6,988,191 B1* | 1/2006 | Rutkowski et al. | 713/1 |
| 2002/0133744 A1* | 9/2002 | Oldfield et al. | 714/11 |
| 2007/0014586 A1* | 1/2007 | Kobayashi | 399/70 |
| 2007/0022189 A1* | 1/2007 | Nguyen et al. | 709/223 |
| 2007/0113601 A1* | 5/2007 | Hu | 70/57.1 |

FOREIGN PATENT DOCUMENTS

| | | |
|---|---|---|
| JP | 4-195666 | 7/1992 |
| JP | 4-268615 | 9/1992 |
| JP | 2000-20157 | 1/2000 |
| JP | 2002-207537 | 7/2002 |
| JP | 2002-324012 | 11/2002 |
| JP | 2004-38546 A | 2/2004 |
| JP | 2004-194298 A | 7/2004 |
| JP | 2005-56321 A | 3/2005 |
| JP | 2005-309807 | 11/2005 |
| JP | 2007-148633 | 6/2007 |

* cited by examiner

*Primary Examiner* — M Elamin
(74) *Attorney, Agent, or Firm* — Oblon, Spivak, McClelland, Maier & Neustadt, L.L.P.

(57) ABSTRACT

Each of a plurality of control units starts the control unit with one of a first start method and a second start. When a first control unit among the control units starts with a second start method, the first control unit instructs a second control unit among the control units to start with the second start method. Thus, all the control units are started with the same start method.

6 Claims, 6 Drawing Sheets

| CONTROL UNIT | START MODE |
|---|---|
| CONTROLLING UNIT | 0 |
| OPERATING UNIT | 1 |
| PLOTTING UNIT | 1 |

| CONTROL UNIT | START MODE |
|---|---|
| IMAGE FORMING APPARATUS | 0 |

ELECTRONIC EQUIPMENT, IMAGE FORMING APPARATUS, STARTING METHOD OF ELECTRONIC EQUIPMENT, AND COMPUTER PROGRAM PRODUCT

CROSS-REFERENCE TO RELATED APPLICATIONS

The present application claims priority to and incorporates by reference the entire contents of Japanese priority document 2008-149334 filed in Japan on Jun. 6, 2008.

BACKGROUND OF THE INVENTION

1. Field of the Invention

The present invention relates to start controlling of a plurality of control units that can start themselves respectively and independently of each other.

2. Description of the Related Art

Some electronic equipment, such as an image forming apparatus, includes a plurality of functional units. In such electronic equipment, parts that correspond to one function are assembled into a module. Moreover, a control means is provided corresponding to each function to individually control the function. Such a control unit includes a control means (CPUs and the like) whereby the control unit can operate respectively and independently of each other. The control means control starting and stopping of their respective control units, independently of each other.

A start method called "hibernation" is widely used to reduce a start time of electronic equipment. For example, Japanese Patent Application Laid-open No. 2002-207537 discloses a conventional technology in which a computer system includes a system start selecting unit for selecting, at the time of a start-up of the computer system, either of a first system-start mode in which a hibernation function is invalidated when the computer system is started from a stop state of the computer system, and a second system-start mode in which the hibernation function is validated when the computer system is started from the stop state of the computer system, and when the second system-start mode is selected by the system start selecting unit, the hibernation function is validated and then the computer system is started.

However, when the hibernation is used in the electronic equipment including the plurality of control unit, and the start methods of all of the control units are not matched, a mismatch of data sent between the control units can occur. For example, when firmware is updated in one of the control units, the control unit is required to be started with a normal start mode to reflect the update and update information sent to/from another of the control unit. In this case, when another of the control units included in the same electronic equipment is started with the hibernation, the control unit can fail to operate normally at a restart of the control unit.

Because Japanese Patent Application Laid-open No. 2002-207537 does not describe about any application to an electronic equipment including a plurality of control units that start themselves respectively and independently of each other, it is impossible to control the start methods of the control units, individually. A user has to make a choice between the start method with the hibernation and the normal start method, consciously. Thus, the operation is inconvenient for the user, and it is difficult to always select the correct start method depending on states of the control unit.

SUMMARY OF THE INVENTION

It is an object of the present invention to at least partially solve the problems in the conventional technology.

According to an aspect of the present invention, there is provided electronic equipment comprising a plurality of control units that can start themselves independently of each other. Each of the control units includes a start controlling unit that starts the control unit with one of a first start method and a second start method; a judging unit that judges a start method of the control unit; and a start method instructing unit that instructs a start method to other control units. The start method instructing unit of a first control unit among the control units instructs a second control unit among the control units to start the second control unit with the second start method when the second start method is judged by the judging unit of the first control unit, and when a start method is instructed by the start method instructing unit of the second control unit, the start controlling unit of the first control unit starts the first control unit with the start method instructed by the start method instructing unit of the second control unit.

According to another aspect of the present invention, there is provided an starting method of electronic equipment, the electronic equipment comprising a plurality of control units that can start themselves independently of each other, each of the control units performing starting the control unit with one of a first start method and a second start method; judging a start method of the control unit; and instructing a start method to other control units. A first control unit among the control units instructs a second control unit among the control units to start the second control unit with the second start method when the second start method is judged at the judging performed by the first control unit, and when a start method is instructed from the second control unit, the start controlling unit of the first control unit starts the first control unit with the start method instructed from the second control unit.

According to still another aspect of the present invention, there is provided a computer program product including a computer-readable recording medium containing a start controlling computer program executed by a computer of each of a plurality of control units that can start themselves independently of each other included in an electronic equipment, wherein the start controlling computer program causes the computer to function as a start controlling unit that starts the control unit with one of a first start method and a second start method; as a judging unit that judges a start method of the control unit; and as a start method instructing unit that instructs a start method to other control units. The start method instructing unit of a first control unit among the control units instructs a second control unit among the control units to start the second control unit with the second start method when the second start method is judged by the judging unit of the first control unit, and when a start method is instructed by the start method instructing unit of the second control unit, the start controlling unit of the first control unit starts the first control unit with the start method instructed by the start method instructing unit of the second control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. An example of an image forming apparatus is described below. This invention can be applied to any electronic equipment such as a Personal Computer (PC) or a mobile terminal that includes a plurality of control units.

Figure 1:
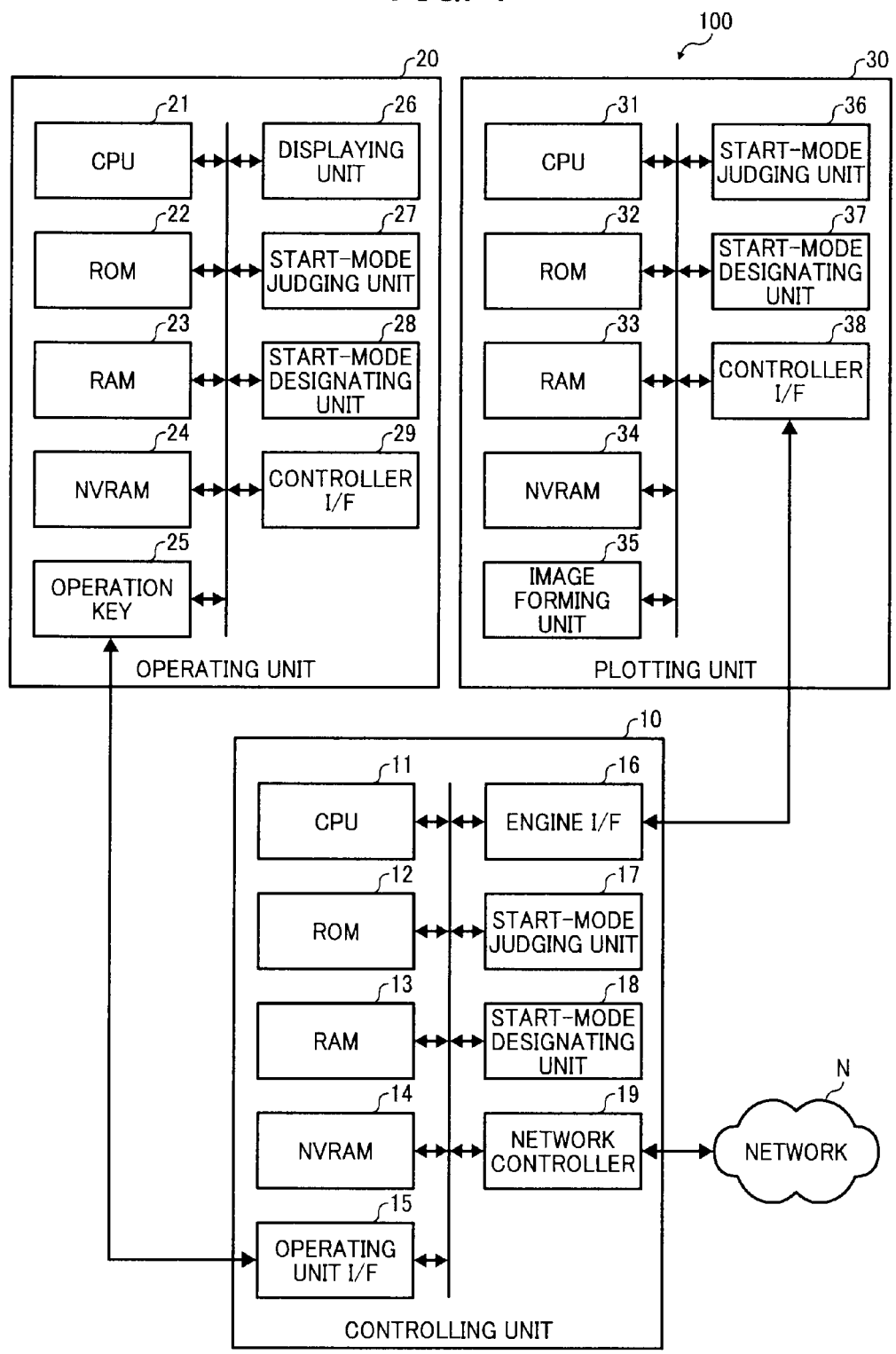
FIG. 1 is a block diagram of an image forming apparatus according to a first embodiment of the present invention.

FIG. 1 is a block diagram of an image forming apparatus 100 according to a first embodiment of the present invention. The image forming apparatus 100 includes three control units (functional units): a controlling unit 10, an operating unit 20, and a plotting unit 30.

The controlling unit 10 integrally manages the operations of the image forming apparatus 100. The controlling unit 10 includes a CPU 11, a ROM 12, a RAM 13, a NVRAM 14, an operating unit interface (I/F) 15, an engine I/F 16, a start-mode judging unit 17, a start-mode designating unit 18, and a network controller 19.

The CPU 11 controls the operations of the controlling unit 10 integrally in cooperation with predetermined computer programs stored in the ROM 12 and the NVRAM 14. The CPU 11 controls the start and stop of the controlling unit 10. The CPU 11 includes a reset circuit (not shown), and starts the controlling unit 10 based on a reset signal generated by the reset circuit.

When the controlling unit 10, or the image forming apparatus 100, is stopped or suspended, the CPU 11 obtains a snapshot of the memory contents developed in the RAM 13 and stores the snapshot into the NVRAM 14. When the controlling unit 10 is started the next time, the CPU 11 develops in the RAM 13 the snapshot stored in the NVRAM 14 again. Thus, a start from hibernation is achieved, in which the controlling unit 10 is restarted from a state when the snapshot is obtained, or a state when the controlling unit 10 is stopped the last time. Hereinafter, this start method (start mode) is called "hibernation start mode". Set information to designate a start mode of the controlling unit 10 is stored beforehand in a predetermined area of the NVRAM 14. The CPU 11 starts the controlling unit 10 in accordance with the set information in the NVRAM 14. Hereinafter, the set information to designate the start mode in the NVRAM 14 is called "start mode set".

When the CPU 11 executes a computer program to update firmware of the controlling unit 10, the CPU 11 sets the start mode set in the NVRAM 14 to a normal start method (hereinafter, "normal start mode") through the start-mode designating unit 18 to reflect the update. The CPU 11 starts the controlling unit 10 the next time by using the normal start mode. The normal start mode corresponds to a start method without the snapshot, and more specifically includes a start method to initialize and start predetermined units of the controlling unit 10 with a predetermined computer program to start, a start method to be executed first after the image forming apparatus 100 is manufactured for its various settings (initial start), a start method to start the image forming apparatus 100 with reduced functions (safe mode) and the like. A switching of start mode can be performed voluntarily by the CPU 11 based on contents of a computer program to be executed. Operations of the CPU 11 to switch start mode can be pre-included in the computer program to update the firmware.

When the CPU 11 receives an instruction to restart (reset) the controlling unit 10 from one of the other control units, the CPU 11 restarts the controlling unit 10 based on the start mode set in the NVRAM 14. It is assumed that the default start mode is the hibernation start mode, and that the CPU 11 starts the controlling unit 10 in the hibernation start mode when there is no explicit instruction for the start method, for example, the start mode set is not in the NVRAM 14.

The ROM 12 is a read only type of memory device, and stores therein various computer programs and set information to control entire operations of the image forming apparatus 100 and the controlling unit 10. The RAM 13 is a volatile memory such as a Dynamic RAM (DRAM) and a Synchronous DRAM (SDRAM), and functions as a work area for the CPU 11. The NVRAM 14 is a rewritable nonvolatile memory, and stores therein various computer programs and set information to control entire operations of the image forming apparatus 100 and the controlling unit 10. The NVRAM 14 stores therein the snapshot obtained from the RAM 13 by the CPU 11.

The operating unit I/F 15 is an interface to connect to the operating unit 20, and controls communication between the controlling unit 10 and the operating unit 20. The engine I/F 16 is an interface to connect to the plotting unit 30, and controls communication between the controlling unit 10 and the plotting unit 30. The operating unit I/F 15 and the engine I/F 16 relay communication through the controlling unit 10 between the operating unit 20 and the plotting unit 30.

When the CPU 11 starts the controlling unit 10, the start-mode judging unit 17 refers to the start mode in the NVRAM 14, and judges whether the start mode is the hibernation start mode or the normal start mode.

According to control of the CPU 11, the start-mode designating unit 18 sets in the NVRAM 14 the start method instructed by the CPU 11 as the start mode set. When the judgment result by the start-mode judging unit 17 is "the normal start mode", the start-mode designating unit 18 judges that each of the start modes of the other control units (the operating unit 20 and the plotting unit 30) is required to be identical to the normal start mode, and sets each of the start mode sets in the NVRAMs of the other control units to the normal start mode, and then transmits instructions to restart. Thus, the start-mode designating unit 18 starts each of the other control units in the normal start mode.

The network controller 19 is an interface to connect to a network N such as the Internet and an intranet. The network controller 19 controls communication between the controlling unit 10 and another apparatus (not shown) connected to the controlling unit 10 through the network N.

The operating unit 20 provides a user interface for receiving an instruction from a user and displaying a state of the image forming apparatus 100. The operating unit 20 includes a CPU 21, a ROM 22, a RAM 23, a NVRAM 24, an operation key 25, a displaying unit 26, a start-mode judging unit 27, a start-mode designating unit 28, and a controller I/F 29.

The CPU 21 is a control device of the operating unit 20, and controls the units of the operating unit 20 integrally in cooperation with predetermined computer programs stored in the ROM 22 and the NVRAM 24. The CPU 21 controls the start and stop of the operating unit 20. The CPU 21 includes a reset circuit (not shown), and starts the operating unit 20 based on a reset signal generated by the reset circuit.

When the operating unit 20, or the image forming apparatus 100, is stopped or suspended, the CPU 21 obtains a snapshot of the memory contents developed in the RAM 23 and stores the snapshot into the NVRAM 24. When the operating unit 20 is started the next time, the CPU 21 develops in the RAM 23 the snapshot stored in the NVRAM 24 again. Thus, a start from hibernation is achieved, in which the operating unit 20 is restart from a state when the snapshot is obtained. Set information to designate a start mode of the operating unit 20 is stored beforehand in a predetermined area of the NVRAM 24. The CPU 21 starts the operating unit 20 based on a start mode set in the NVRAM 24.

When the CPU 21 executes a computer program to update firmware of the operating unit 20, the CPU 21 switches the start mode set in the NVRAM 24 from the hibernation start mode to a normal start method (hereinafter, "normal start mode") through the start-mode designating unit 28 to reflect the update. The CPU 21 starts the operating unit 20 the next time by using the normal start mode. A switching of start mode can be performed voluntarily by the CPU 21 based on contents of a computer program to be executed. Operations of the CPU 21 to switch start method can be pre-included in the computer program to update the firmware.

When the CPU 21 receives an instruction to restart the operating unit 20 from one of the other control units, the CPU 21 restarts the operating unit 20 by using the start method in the NVRAM 24. It is assumed that the default start method is the hibernation start mode, and that the CPU 21 starts the operating unit 20 by using the hibernation start mode when there is no explicit instruction for the start method, for example, the start method is not in the NVRAM 24.

The ROM 22 is a read only type of memory device, and stores therein various computer programs and set information to control the operating unit 20. The RAM 23 is a volatile memory such as a DRAM and a SDRAM, and functions as a work area for the CPU 21. The NVRAM 24 is a rewritable nonvolatile memory, and stores therein various computer programs and set information to control the operating unit 20. The NVRAM 24 stores therein the snapshot obtained from the RAM 23 by the CPU 21.

The operation key 25 is an input device such as a keyboard and an operation button, and when the operation key 25 receives an operation by a user, the operation key 25 outputs the operation contents as instruction information to the CPU 21. The displaying unit 26 is a display device such as a liquid crystal display (LCD) and an organic electro-luminescence (EL), and displays information showing a state of the image forming apparatus 100 and the like input from the controlling unit 10 under control of the CPU 21. The displaying unit 26 can be a touch panel integrally formed with the operation key 25.

When the CPU 21 starts the operating unit 20, the start-mode judging unit 27, with reference to the start mode in the NVRAM 24, judges whether the start mode is the hibernation start mode or the normal start mode.

According to control of the CPU 21, the start-mode designating unit 28 sets in the NVRAM 24 the start method instructed by the CPU 21 as the start mode set. When the judgment result by the start-mode judging unit 27 is "the normal start mode", the start-mode designating unit 28 judges that each of the start modes of the other control units (the controlling unit 10 and the plotting unit 30) is required to be identical to the normal start mode, and sets each of the start mode sets in the NVRAMs of the other control units to the normal start mode, and then transmits instructions to restart. Thus, the start-mode designating unit 28 starts each of the other control units in the normal start mode.

The controller I/F 29 is an interface to connect to the controlling unit 10, and controls communication between the operating unit 20 and the controlling unit 10.

The plotting unit 30 is the control unit that forms an image transmitted with an electric signal from the controlling unit 10 on an ordinary paper or a thermal paper and the like with an image forming device such as an electrophotographic device, a thermal printer, a thermal-transfer printer and an ink-jet printer. The plotting unit 30 includes a CPU 31, a ROM 32, a RAM 33, a NVRAM 34, an image forming unit 35, a start-mode judging unit 36, a start-mode designating unit 37, and a controller I/F 38.

The CPU 31 controls the operations of the plotting unit 30 integrally in cooperation with predetermined computer programs stored in the ROM 32 and the NVRAM 34. The CPU 31 controls the start and stop of the plotting unit 30. The CPU 31 includes a reset circuit (not shown), and starts the plotting unit 30 based on a reset signal generated by the reset circuit.

When the plotting unit 30, or the image forming apparatus 100, is stopped or suspended, the CPU 31 obtains a snapshot of the memory contents developed in the RAM 33 and stores the snapshot into the NVRAM 34. When the plotting unit 30 is started the next time, the CPU 31 develops in the RAM 33 the snapshot stored in the NVRAM 34 again. Thus, a start from hibernation is achieved, in which the plotting unit 30 is restart from a state when the snapshot is obtained. Set information to designate a start mode of the plotting unit 30 is stored beforehand in a predetermined area of the NVRAM 34. The CPU 31 starts the plotting unit 30 based on the start mode in the NVRAM 34.

When the CPU 31 executes a computer program to update firmware of the plotting unit 30, the CPU 31 switches the start mode in the NVRAM 34 from the hibernation start mode to the normal start mode to reflect the update. The CPU 31 starts the plotting unit 30 the next time by using the normal start mode. A switching of start mode can be performed voluntarily by the CPU 31 based on contents of a computer program to be executed. Operations of the CPU 31 to switch start method can be pre-included in the computer program to update the firmware.

When the CPU 31 receives an instruction to restart the plotting unit 30 from one of the other control units, the CPU 31 restarts the plotting unit 30 using the start method in the NVRAM 34. It is assumed that the default start method is the hibernation start mode, and that the CPU 31 starts the plotting unit 30 by using the hibernation start mode when there is no explicit instruction for the start method, for example, the start method is not in the NVRAM 34.

The ROM 32 is a read only type of memory device, and stores therein various computer programs and set information to control the plotting unit 30. The RAM 33 is a volatile memory such as a DRAM and a SDRAM, and functions as a work area for the CPU 31. The NVRAM 34 is a rewritable nonvolatile memory, and stores therein various computer programs and set information to control the plotting unit 30. The NVRAM 34 stores therein the snapshot obtained from the RAM 33 by the CPU 31.

The image forming unit 35 is the image forming device such as an electrophotographic device, a thermal printer, a thermal-transfer printer and an ink-jet printer, and forms an image on a plain paper or a thermal paper and the like according to control of the CPU 31.

When the CPU 31 starts the plotting unit 30, the start-mode judging unit 36, with reference to the start mode in the NVRAM 34, judges whether the start mode is the hibernation start mode or the normal start mode.

According to control of the CPU 31, the start-mode designating unit 37 sets in the NVRAM 34 the start method instructed by the CPU 31 as the start mode set. When the judgment result by the start-mode judging unit 36 is "the normal start mode", the start-mode designating unit 37 judges that each of the start modes of the other control units (the controlling unit 10 and the operating unit 20) is required to be identical to the normal start mode, and sets each of the start mode sets in the NVRAMs of the other control units to the normal start mode, and then transmits instructions to restart. Thus, the start-mode designating unit 37 starts each of the other control units in the normal start mode.

The controller I/F 38 is an interface to connect to the controlling unit 10, and controls communication between the plotting unit 30 and the controlling unit 10.

As described above, the control units included in the image forming apparatus 100 can start and stop the control units themselves, respectively and independently of each other. In the embodiment, an example of the image forming apparatus including three control units (the controlling unit 10, the operating unit 20, and the plotting unit 30) that start themselves respectively and independently of each other is shown. This invention can be applied to an image forming apparatus including only two control units, such as the controlling unit 10 and the plotting unit 30, and also can be applied to an image forming apparatus including two more control units corresponding to a scanning function and a fax function in addition the three control unit.

Figure 2:
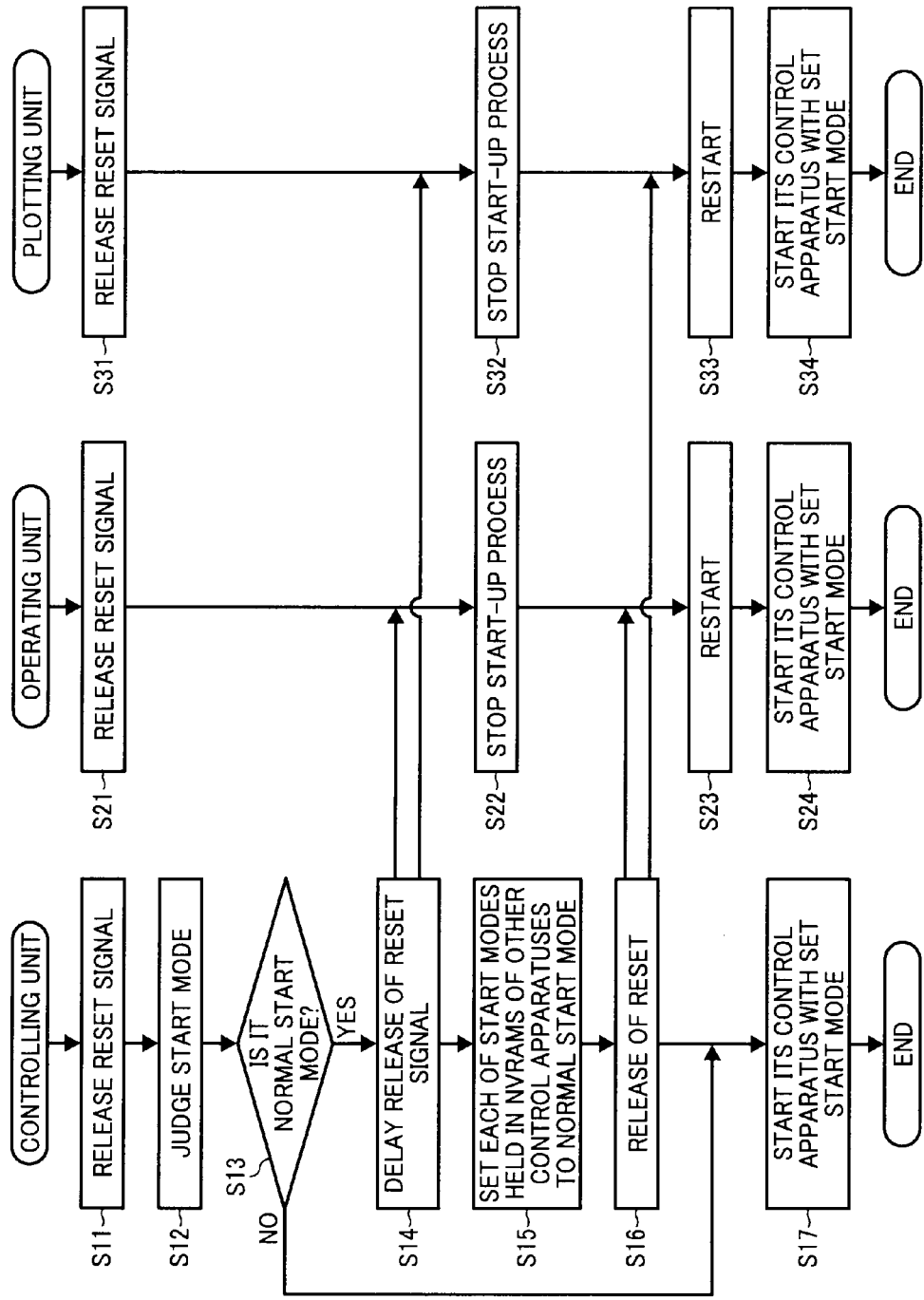
FIG. 2 is a flowchart of a start-up process performed by control units of the image forming apparatus shown in FIG. 1.

FIG. 2 is a flowchart of an operating procedure of a start-up process of the image forming apparatus 100 when the image forming apparatus 100 is started. In FIG. 2, Steps S11 to S17 denote processes performed by the controlling unit 10, and Steps S21 to S24 denote processes performed by the operating unit 20, and Steps S31 to S34 denote processes performed by the plotting unit 30. To simplify the explanation, it is assumed that the controlling unit 10 is set as a leader in the start mode switching. It is needless to mention that the operating unit 20 and the plotting unit 30 can be set as a leader.

First, when a start of the image forming apparatus 100 is instructed by a user by pushing a power button (not shown) and the like, the CPU 11 of the controlling unit 10 starts a start-up process of the controlling unit 10 by releasing a reset signal when a voltage supplied to the controlling unit 10 reaches a predetermined voltage level (Step S11). Also in the operating unit 20 and the plotting unit 30, the CPU 21 and the CPU 31 start start-up processes of the operating unit 20 and the plotting unit 30 by releasing reset signals when voltages supplied to their control units reach predetermined voltage levels, respectively (Steps S21 and S31).

Next, the start-mode judging unit 17 judges whether the start method of the controlling unit 10 is the hibernation start mode or the normal start mode with reference to the NVRAM 14 (Step S12). The start-mode designating unit 18 judges whether the judgment result by the start-mode judging unit 17 is the normal start mode. When the start-mode designating unit 18 judges the judgment result is the hibernation start mode (No at Step S13), a process of Step S17 is performed immediately.

At Step S13, when the start-mode designating unit 18 judges the judgment result is the normal start mode (Yes at Step S13), the start-mode designating unit 18 sends a signal to each of the CPUs (the CPU 21 and the CPU 31) of the other control units indicating the release of the reset signal is delayed (Step S14). The start-mode designating unit 18 then sets each of the start modes in the NVRAMs (the NVRAM 24, the NVRAM 34) included in the other control units to normal start mode (Step S15). The start-mode designating unit 18 instructs each of the other control units to restart by sending a signal to each of the other control units indicating the release of the reset signal (Step S16). Then, at Step S17, the CPU 11 starts the controlling unit 10 with the start mode set in the NVRAM 14, and then the process is ended.

Prior to Step S14, the start-mode designating unit 18 can judge whether the normal start mode is set in each of the NVRAMs of the other control units, and if the start-mode designating unit 18 judges the normal start modes are set in all of the NVRAMs, Steps S14 to S16 can be omitted. Thus, it is possible to prevent inadvertent performances of Steps S14 to S16 and reduce the start time as the result.

At Step S15, when the normal start mode is set in each of the NVRAMs of the other control units, information such as a flag indicating the restart has been performed (hereinafter, "flag information") can be set, together with the normal start mode. In this case, the start-mode designating units 18, 28, and 37 can be controlled such that the start-mode designating units 18, 28, and 37 perform Steps S14 to S16 only when each of the judgment results by the start-mode judging units 17, 27, and 36 is the normal start mode, and the flag information is not set in each of the NVRAMs. Thus, it is possible to prevent the duplicative performance of Steps S14 to S16 and reduce the start time as the result.

On the other hand, in the operating unit 20 and the plotting unit 30, when each of the CPU 21 and the CPU 31 receives the signal indicating the release of the reset signal is delayed from the controlling unit 10, each of the CPU 21 and the CPU 31 stop the start-up process (Steps S22 and S32). Next, when each of the CPU 21 and the CPU 31 receives the signal indicating the release of the reset signal from the controlling unit 10, the CPU 21 and the CPU 31 restart the start-up processes of the operating unit 20 and the plotting unit 30 by releasing the reset signals, respectively (Steps S23 and S33). The CPU 21 and the CPU 31 start the operating unit 20 and the plotting unit 30 based on the normal start modes in the NVRAMs, respectively (Steps S24 and S33), and then the processes are ended.

According to the first embodiment of the present invention, when any one of the control units of the image forming apparatus 100 judges, on its start-up, that each of the others of the control units is required to have an identical start method to the start method of the one of the control units, the one of the control units instructs each of the others of the control units to restart with the start method of the one of the control units. Thus, when each of the others of the control units receives the instruction regarding the start method, each of the others of the control units restarts with the instructed start method. It is possible to match the start methods depending on a state of the one of the control units.

As an alternative method, the start-mode judging units (the start-mode judging units 17, 27, and 36) and the start-mode designating units (the start-mode designating units 18, 28, and 37) can be realized by cooperation between the CPUs and predetermined computer programs (software) included in the control units, or can be realized by hardware such as application specific integrated circuits (ASICs), respectively.

As an alternative method, the start-mode designating unit of which the control unit is in the normal start mode instructs the CPU of each of the other control units through the NVRAM of each of the other control units to switch the start mode to the normal start mode. The start-mode designating unit can directly instruct the CPU of each of the other control units to switch the start mode to the normal start mode. For example, when the control unit is connected to each of the other control units with a general purpose interface such as a generalized input/output interface (GIO interface), a method can be employed in which the start mode is instructed directly with a level of a signal input to an I/O port. The start-mode designating units included in the other control units can be instructed to switch the start mode sets in the NVRAMs of the other control units to the normal start mode, respectively.

The NVRAMs are used as nonvolatile memories to store therein the start mode sets. As an alternative method, flash memories can be used as the nonvolatile memories. For example, when the hibernation start mode and the normal start mode are represented by binary values, a value "0" can be written in a memory area of the flash memory. In this case, in order to write a value "1", it is necessary to input an erase command. Here, an arrangement that the start-mode designating unit cannot output the erase command is made, and the hibernation start mode is defined as "1", and the normal start mode is defined as "0". Thus, it is possible to prevent a switch of the set from the normal start mode to the hibernation start mode. Each of the CPUs initializes the flash memory after starting the control unit corresponding to the CPU in accordance with the start mode set.

In the first embodiment, it is possible to match the start methods used in the control units. However, there is a disadvantage that the start time is lengthened by a time of a restart to designate the start mode. An image forming apparatus according to a second embodiment of the present invention is capable of further reducing the start time as well as matching the start modes used in the control units. In the following explanation, the same reference numerals are assigned to the same components as those of the first embodiment, and explanations thereof are omitted.

Figure 3:
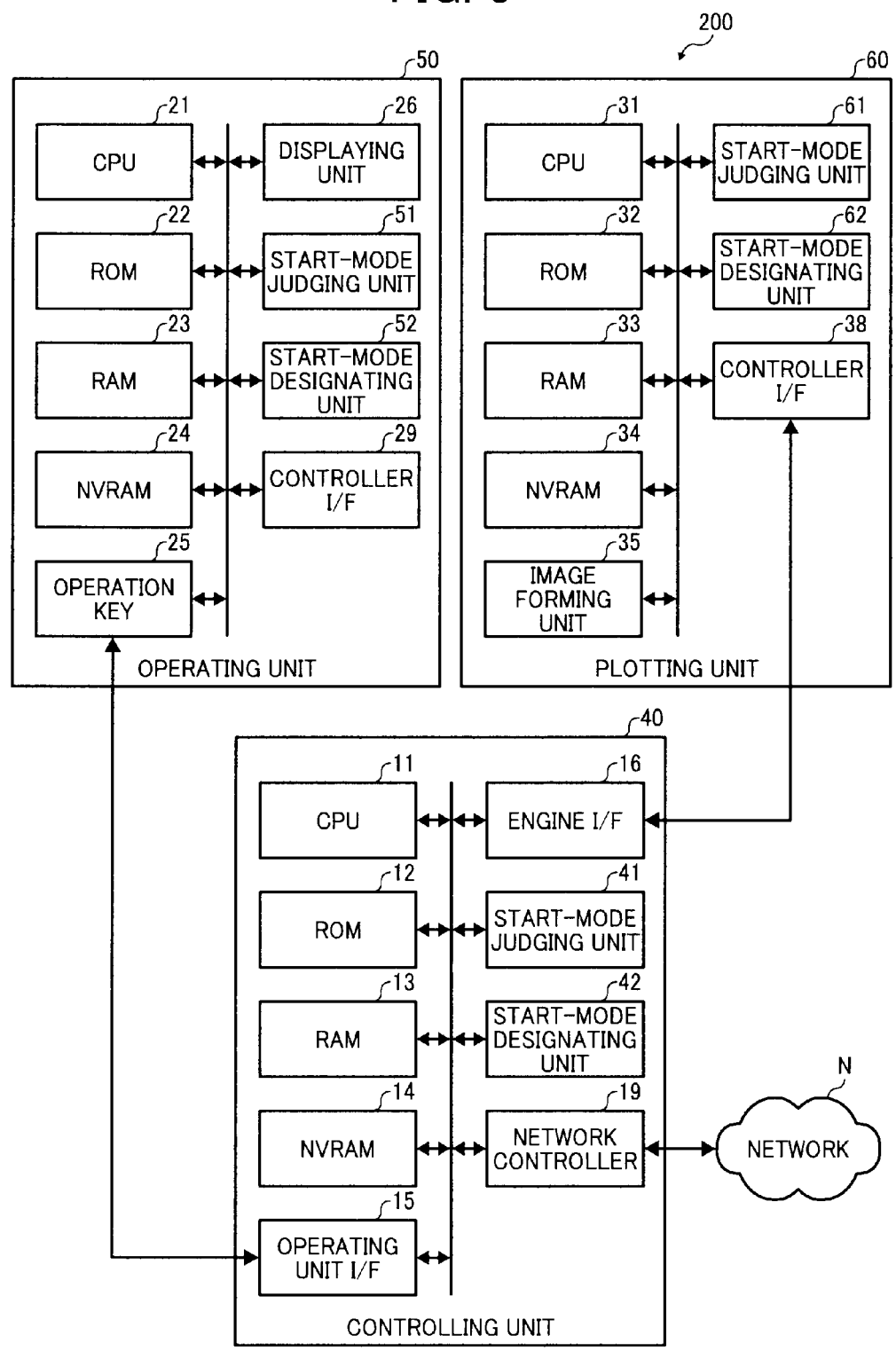
FIG. 3 is a block diagram of an image forming apparatus according to a second embodiment of the present invention.

FIG. 3 is a block diagram of an image forming apparatus 200 according to the second embodiment of the present invention. The image forming apparatus 200 includes three control units: a controlling unit 40, an operating unit 50, and a plotting unit 60.

The controlling unit 40 integrally manages the operations of the image forming apparatus 200. The controlling unit 40 includes the CPU 11, the ROM 12, the RAM 33, the NVRAM 14, the operating unit I/F 15, the engine I/F 16, a start-mode judging unit 41, a start-mode designating unit 42, and the network controller 19.

After the controlling unit 40 is started, the start-mode judging unit 41 refers to a start mode set in the NVRAM 14 periodically, and judges whether the start mode is the hibernation start mode or the normal start mode.

According to control of the CPU 11, the start-mode designating unit 42 sets in the NVRAM 14 the start method instructed by the CPU 11 as the start mode set. When the judgment result by the start-mode judging unit 41 is "the normal start mode", the start-mode designating unit 42 judges that each of the start modes of the other control units (the operating unit 50 and the plotting unit 60) is required to be identical to the normal start mode, and sets each of the start modes in the NVRAMs of the other control units to the normal start mode. Thus, the start-mode designating unit 42 sets each of the start modes used when the other control units start the next time to the normal start mode.

The operating unit 50 provides a user interface for receiving an instruction from a user and displaying a state of the image forming apparatus 200. The operating unit 50 includes the CPU 21, the ROM 22, the RAM 23, the NVRAM 24, the operation key 25, the displaying unit 26, a start-mode judging unit 51, a start-mode designating unit 52, and the controller I/F 29.

After the operating unit 50 is started, the start-mode judging unit 51 refers to a state of the start mode in the NVRAM 24 periodically, and judges whether the start mode is the hibernation start mode or the normal start mode.

According to control of the CPU 21, the start-mode designating unit 52 sets in the NVRAM 24 the start method instructed by the CPU 21 as the start mode set. When the judgment result by the start-mode judging unit 51 is "the normal start mode", the start-mode designating unit 52 judges that each of the start modes of the other control units (the controlling unit 40 and the plotting unit 60) is required to be identical to the normal start mode, and sets each of the start modes in the NVRAMs of the other control units to the normal start mode. Thus, the start-mode designating unit 52 sets each of the start modes used when the other control units start the next time to the normal start mode.

The plotting unit 60 forms an image transmitted with an electric signal from the controlling unit 40 on a plain paper or a thermal paper and the like with an image forming device such as an electrophotographic device, a thermal printer, a thermal-transfer printer and an ink-jet printer. The plotting unit 60 includes the CPU 31, the ROM 32, the RAM 33, the NVRAM 34, the image forming unit 35, a start-mode judging unit 61, a start-mode designating unit 62, and the controller I/F 38.

After the plotting unit 60 is started, the start-mode judging unit 61 refers to a state of the start mode in the NVRAM 34, periodically and judges whether the start mode is the hibernation start mode or the normal start mode.

According to control of the CPU 31, the start-mode designating unit 62 sets in the NVRAM 34 the start method instructed by the CPU 31 as the start mode set. When the judgment result by the start-mode judging unit 61 is "the normal start mode", the start-mode designating unit 62 judges that each of the start modes of the other control units (the controlling unit 40 and the operating unit 50) is required to be identical to the normal start mode, and sets each of the start modes in the NVRAMs of the other control units to the normal start mode. Thus, the start-mode designating unit 62 sets each of the start modes used when the other control units start the next time to the normal start mode.

Figure 4:
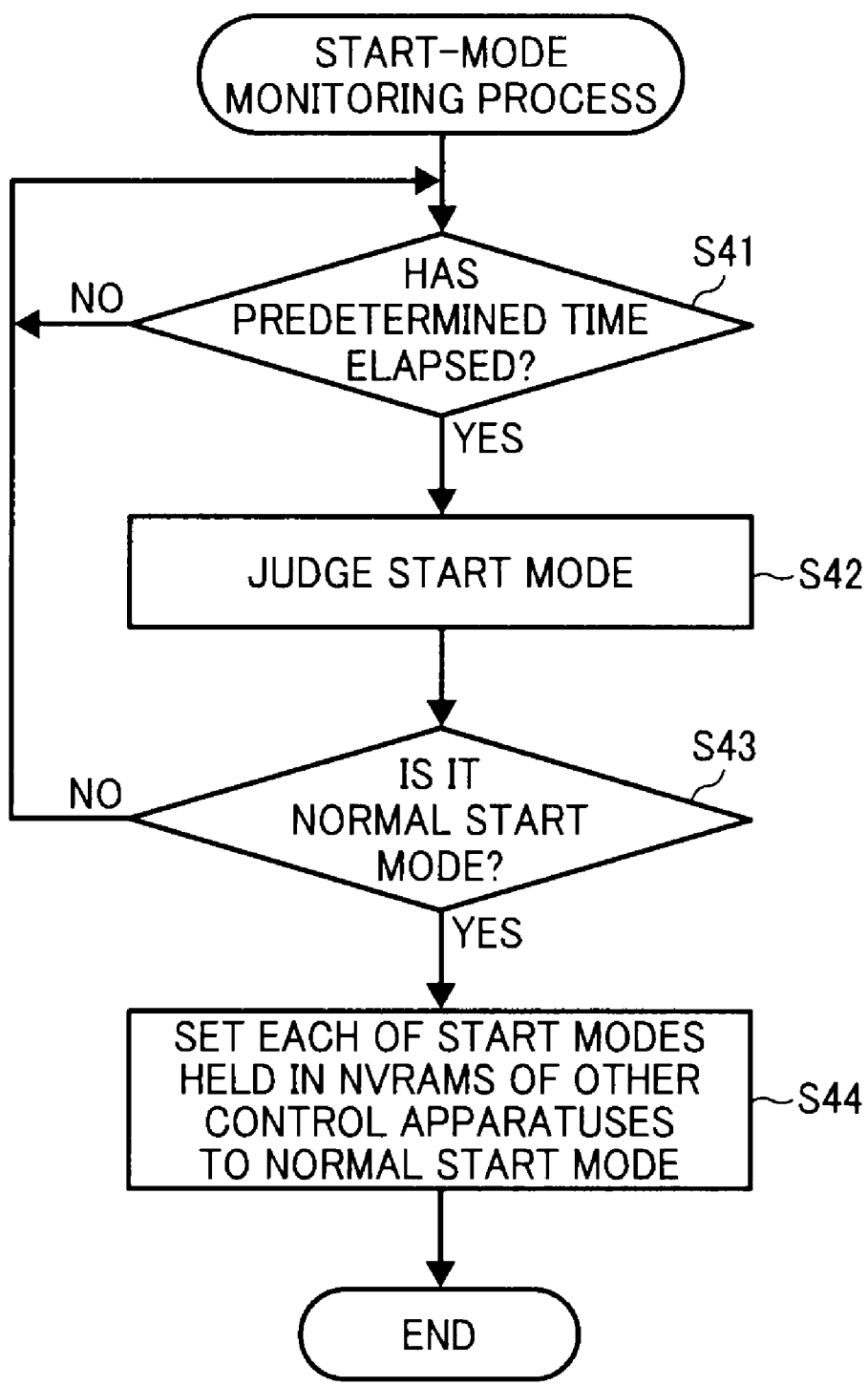
FIG. 4 is a flowchart of a start-mode monitoring process performed by each of control units of the image forming apparatus shown in FIG. 2.

FIG. 4 is a flowchart of a start mode monitoring process of each of the control units of the image forming apparatus 200. Before the start mode monitoring process is performed, each of the control units of the image forming apparatus 200 is started under the same start mode. The start mode monitoring process in the controlling unit 40 is explained below. Similar process to that in the controlling unit 40 is performed in each of the operating unit 50 and the plotting unit 60.

First, the start-mode judging unit 41 waits until a predetermined time elapses (No at Step S41), and when the start-mode judging unit 41 judges that the predetermined time has elapsed (Yes at Step S41), the start-mode judging unit 41 judges the start mode of the controlling unit 40, periodically, with reference to the state of the start mode in the NVRAM 34 (Step S42).

The CPU 11 controls the entire image forming apparatus 200 by a process independent of the start mode monitoring process. When the normal start mode is required to be set as the start mode used when the controlling unit 40 is started the next time because of the update of the firmware of the controlling unit 40 and the like, the CPU 11 sets the start mode set of the NVRAM 14 to the normal start mode through the start-mode designating unit 42.

Next, the start-mode designating unit 42 judges whether the judgment result of Step S42 is the normal start mode (Step S43). When the start-mode designating unit 42 judges the judgment result is the hibernation start mode (No at Step S43), the process control returns to Step S41 again. When the judgment result is judged to be the normal start mode at Step S43 (Yes at Step S43), the start-mode designating unit 42 sets each of the start modes in the NVRAMs (the NVRAM 24, the NVRAM 34) included in the other control units (the operating unit 50, the plotting unit 60) to the normal start mode (Step S44), and then the process is ended.

Prior to Step S44, the start-mode designating unit 42 can judge whether the normal start mode is set in each of the NVRAMs of the other control units, and if the start-mode designating unit 42 judges the normal start modes are set in all of the NVRAMs, Step S44 can be omitted. Thus, it is possible to prevent inadvertent performances of Step S44 and reduce the start time as the result.

At Step S44, when the normal start mode is set in each of the NVRAMs of the other control units, flag information indicating the restart has been performed can be set, together with the normal start mode. In this case, the start-mode designating units 42, 53, and 62 can be controlled such that the start-mode designating units 42, 53, and 62 perform Step S44 only when each of the judgment results by the start-mode judging units 41, 51, and 61 is the normal start mode, and the flag information is not set in each of the NVRAMs. Thus, it is possible to prevent the duplicative performance of Step S44 and reduce the start time as the result.

After the start mode monitoring process, when a stop or a restart of the image forming apparatus 200 is instructed by the user by pushing a power button (not shown) and the like, each of the CPUs of the control units stops the control unit corresponding to the CPU. Then, each of the CPUs of the control units starts the control unit corresponding to the CPU the next time with the normal start mode in accordance with the normal start mode set in the NVRAM corresponding to the CPU. When the normal start mode is set in the NVRAM, it can be eliminated to obtain the snapshot.

According to the second embodiment of the present invention, when one of the control units of the image forming apparatus 200 sets the start mode used when the one of the control units starts the next time, and judges that each of the others of the control units is required to have an identical start methods to the start method of the one of the control units, the one of the control units instructs each of the others of the control units to start the next time with the start method of the one of the control units. Thus, when each of the others of the control units receives the instruction regarding the start method, each of the others of the control units starts the next time with the instructed start method. It is possible to match the start methods depending on a state of one of the control units.

In the embodiment, the start-mode judging unit of the control unit judges the start mode in the NVRAM, periodically. Any different methods for judging the start mode can be used. For example, when the CPU switches the start mode to the normal start mode, the CPU can report to the start-mode judging unit that the start mode is switched, and at this timing the start-mode judging unit can judge the start mode.

In the second embodiment, the start mode set used when each of the control units is started is in the NVRAM included in the control unit. In an image forming apparatus according to a third embodiment of the present invention, the control units share a single NVRAM to hold the start modes of the control units. In the following explanation, the same reference numerals are assigned to the same components as those of the first and the second embodiments, and explanations thereof are omitted.

Figure 5:
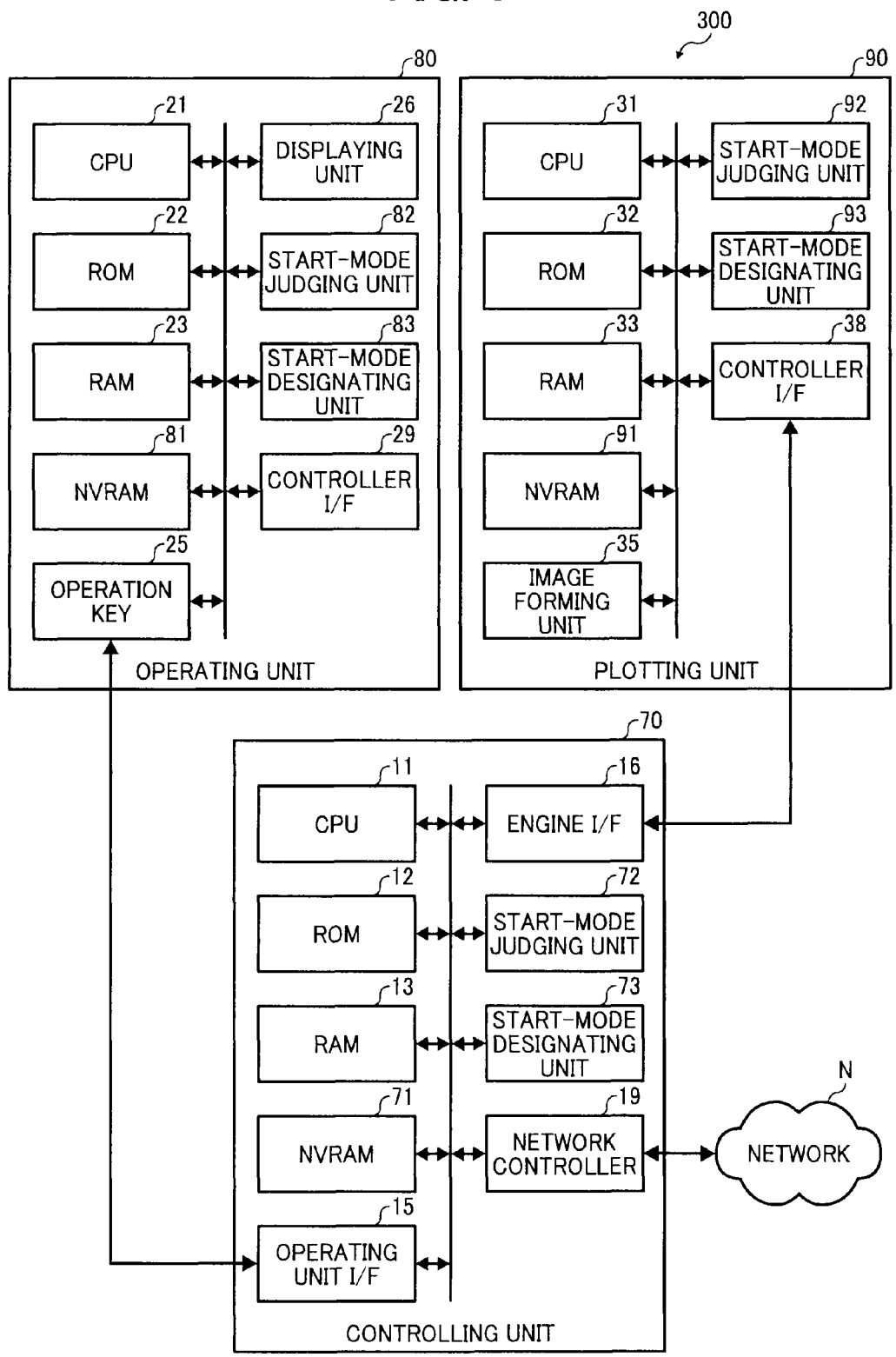
FIG. 5 is a block diagram of an image forming apparatus according to a third embodiment of the present invention.

FIG. 5 is a block diagram of an image forming apparatus 300 according to the third embodiment of the present invention. The image forming apparatus 300 includes three control units: a controlling unit 70, an operating unit 80, and a plotting unit 90.

The controlling unit 70 integrally manages the operations of the image forming apparatus 300. The controlling unit 70 includes the CPU 11, the ROM 12, the RAM 33, a NVRAM 71, the operating unit I/F 15, the engine I/F 16, a start-mode judging unit 72, a start-mode designating unit 73, and the network controller 19.

The NVRAM 71 is a rewritable nonvolatile memory, and stores therein various computer programs and set information to control the controlling unit 70. The NVRAM 71 stores therein the snapshot obtained from the RAM 13 by the CPU 11. The NVRAM 71 stores therein the start modes used when the control unit (the controlling unit 70) and the other control units (the operating unit 80 and the plotting unit 90) are started the next time as the set information.

Figures 6, 7, 8:
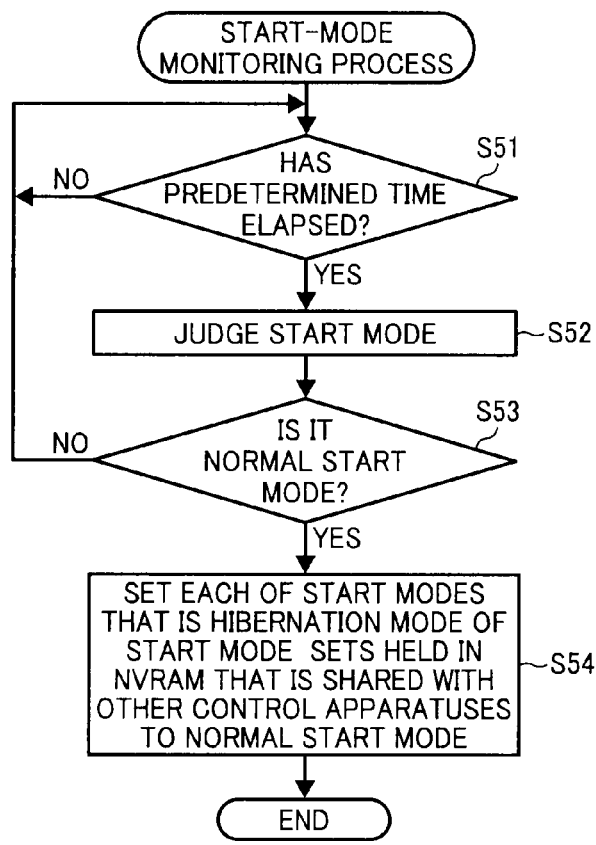
FIG. 6 is an example of a start mode set of the image forming apparatus shown in FIG. 5.
FIG. 7 is a flowchart of a start-mode monitoring process performed by each of control units of the image forming apparatus shown in FIG. 5.
FIG. 8 is an example of a start mode set of a modification of the image forming apparatus shown in FIG. 5.

FIG. 6 is a schematic diagram for explaining the start mode sets of the control units in the NVRAM 71. The start modes of the control units are represented by binary values "0" and "1". The normal start mode is defined as "0", and the hibernation start mode is defined as "1".

After the controlling unit 70 is started, the start-mode judging unit 72 refers to the start mode set of the controlling unit 70 in the NVRAM 71 periodically, and judges whether the start mode is the hibernation start mode or the normal start mode.

According to control of the CPU 11, the start-mode designating unit 73 sets in the NVRAM 71 the start method (the normal start mode) of the control unit (the controlling unit 70). When the judgment result by the start-mode judging unit 72 is "the normal start mode", the start-mode designating unit 73 judges that each of the start modes of the other control units (the operating unit 80 and the plotting unit 90) is required to be identical to the normal start mode, and sets any one that is the hibernation mode of the start mode sets of the other control units in the NVRAM 71 to the normal start mode.

The operating unit 80 provides a user interface for receiving an instruction from a user and displaying a state of the image forming apparatus 300. The operating unit 80 includes the CPU 21, the ROM 22, the RAM 23, a NVRAM 81, the operation key 25, the displaying unit 26, a start-mode judging unit 82, a start-mode designating unit 83, and the controller I/F 29.

The NVRAM 81 is a rewritable nonvolatile memory, and stores therein various computer programs and set information to control the operating unit 80. The NVRAM 81 stores therein the snapshot obtained from the RAM 23 by the CPU 21. The NVRAM 81 does not store therein the start mode set of the operating unit 80 because the start mode set of the operating unit 80 is stored in the NVRAM 71.

After the operating unit 80 is started, the start-mode judging unit 82 refers to the start mode set of the operating unit 80 in the NVRAM 71 of the controlling unit 70 periodically, and judges whether the start mode is the hibernation start mode or the normal start mode.

According to control of the CPU 21, the start-mode designating unit 83 sets in the NVRAM 71 of the controlling unit 70 the start method (the normal start mode) of the control unit (the operating unit 80). When the judgment result by the start-mode judging unit 82 is "the normal start mode", the start-mode designating unit 83 judges that each of the start modes of the other control units (the controlling unit 70 and the plotting unit 90) is required to be identical to the normal start mode, and sets any one that is the hibernation mode of the start mode sets of the other control units in the NVRAM 71 to the normal start mode.

The plotting unit 90 forms an image transmitted with an electric signal from the controlling unit 70 on a plain paper or a thermal paper and the like with an image forming device such as an electrophotographic device, a thermal printer, a thermal-transfer printer and an ink-jet printer. The plotting unit 90 includes the CPU 31, the ROM 32, the RAM 33, a NVRAM 91, the image forming unit 35, a start-mode judging unit 92, a start-mode designating unit 93, and the controller I/F 38.

The NVRAM 91 is a rewritable nonvolatile memory, and stores therein various computer programs and set information to control the plotting unit 90. The NVRAM 91 stores therein the snapshot obtained from the RAM 33 by the CPU 31. The NVRAM 91 does not store therein the start mode set of the plotting unit 90 because the start mode set of the plotting unit 90 is stored in the NVRAM 71.

After the plotting unit 90 is started, the start-mode judging unit 92 refers to the start mode set of the plotting unit 90 in the NVRAM 71 of the controlling unit 70 periodically, and judges whether the start mode is the hibernation start mode or the normal start mode.

According to control of the CPU 31, the start-mode designating unit 93 sets in the NVRAM 71 of the controlling unit 70 the start method (the normal start mode) used when the control unit (the plotting unit 90) is started the next time. When the judgment result by the start-mode judging unit 92 is "the normal start mode", the start-mode designating unit 93 judges that each of the start modes of the controlling unit 70 and the operating unit 80 is required to be identical to the normal start mode, and sets any one that is the hibernation mode of the start mode sets of the other control units in the NVRAM 71 to the normal start mode.

FIG. 7 is a flowchart of a start mode monitoring process of each of the control units of the image forming apparatus 300. Before the start mode monitoring process is performed, each of the control units of the image forming apparatus 300 is started under the same start mode. The start mode monitoring process in the controlling unit 70 is explained below. Similar process to that in the controlling unit 70 is performed in each of the operating unit 80 and the plotting unit 90.

First, the start-mode judging unit 72 waits until a predetermined time elapses (No at Step S51), and when the start-mode judging unit 72 judges that the predetermined time has elapsed (Yes at Step S51), the start-mode judging unit 72 judges the start mode of the controlling unit 70, periodically with reference to the start mode set of the controlling unit 70 in the NVRAM 71 (Step S52).

The CPU 11 controls the controlling unit 70 by a process independent of the start mode monitoring process. When the normal start mode is required to be set as the start mode used when the controlling unit 70 is started the next time because of the update of the firmware of the controlling unit 70 and the like, the CPU 11 sets in the NVRAM 71 to the normal start mode through the start-mode designating unit 73.

Next, the start-mode designating unit 73 judges whether the judgment result of Step S52 is the normal start mode (Step S53). When the start-mode designating unit 73 judges the judgment result is the hibernation start mode (No at Step S53), the process control returns to Step S51 again. When the judgment result is judged to be the normal start mode at Step S53 (Yes at Step S53), the start-mode designating unit 73 sets any one that is the hibernation mode of the start mode sets in the NVRAM 71 that is shared with other control units to the normal start mode (Step S54), and then the process is ended.

According to the third embodiment of the present invention, when one of the control units of the image forming apparatus 300 sets the start mode used when the one of the control units starts the next time, and judges that each of the others of the control units is required to have an identical start method to the start method of the one of the control units, the one of the control units instructs each of the others of the control units to start the next time with the start method of the one of the control units. Thus, when each of the others of the control units receives the instruction regarding the start method, each of the others of the control units starts the next time with the instructed start method. It is possible to match the start methods depending on a state of one of the control units.

The start mode sets of the control units are stored in the NVRAM common to the control units, and can be centralized managed. Thus, the start mode sets can be managed effectively.

In the embodiment, the start mode sets of all of the control units are in the NVRAM 71 included in the controlling unit 70. Alternatively, the start mode sets of all of the control units can be stored in any one of the NVRAMs included in the other control units. The start mode sets of all of the control units can be stored in a recording medium such as a NVRAM provided outside the control units.

Each of the start-mode judging units 72, 82, and 92 judges only the start mode of the control unit including the start-mode judging unit. Each of the start-mode judging units 72, 82, and 92 can judge the start modes of the other control units respectively including the other start-mode judging units in addition to the start mode of the control unit including the start-mode judging unit. In this case, when any one of the start-mode judging units 72, 82, and 92 judges that the start mode set of any one of all of the control units is the normal start mode, the start-mode judging unit switches any one that is the hibernation start mode of the start mode sets of all of the control units in the NVRAM 71 to the normal start mode. Thus, it is possible to match the start methods in the single control unit, and improve efficiency of the processing as the result.

In the embodiment, the respective start mode sets of the control units are stored in the NVRAM 71. As shown in FIG. 8, the start mode set of the image forming apparatus can be set as the start mode sets of the control units, and can be stored in such a manner that the start mode sets are integrated. In this case, when any one of the start-mode designating units 73, 83, and 93 sets the normal start mode, the start mode of all of the control units is switched to the normal start mode. Thus, the start-mode judging units 72, 82, and 92 can be omitted. It is possible to simplify structures of the control units, and reduce memory capacities needed to hold the start mode sets.

According to an aspect of the present invention, it is possible to match start methods depending on a state of one of control units.

It will be apparent to those skilled in the art that various modifications and variations can be made in the present invention. Thus, it is intended that the present invention covers the modifications and variations of this invention provided they come within the scope of the appended claims and their equivalents. The present invention is by no means limited to the above embodiments. In other words, components mentioned above can be modified in the implementation phase without departing from the spirit and scope of the invention.

Various embodiments can be formed by properly combining a plurality of components disclosed in the above embodiments.

For example, the program executed by the image forming apparatus according to each of the first, second, and third embodiments can be provided in such a manner that the program is stored in another computer connected to the computer via a network such as the Internet, and downloaded to the computer via the network. The program can be delivered or distributed via a network such as the Internet.

Moreover, the program can be delivered or distributed, for example, in a state preinstalled in a recording medium such as a ROM.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. Electronic equipment comprising a plurality of control units that can start themselves independently of each other, each of the control units including:
   a start controlling unit that starts the control unit with one of a first start method and a second start method;
   a judging unit that judges a start method of the control unit; and
   a start method instructing unit that instructs a start method to other control units, wherein:
   the start method instructing unit of a first control unit among the control units instructs a second control unit among the control units to start the second control unit with the second start method when the second start method is judged by the judging unit of the first control unit,
   when a start method is instructed by the start method instructing unit of the second control unit, the start controlling unit of the first control unit starts the first control unit with the start method instructed by the start method instructing unit of the second control unit,
   the judging unit judges the start method when the control unit is started,
   the start method instructing unit of the first control unit instructs the second control unit to restart the second control unit after instructing the second control unit to use the second start method, and
   when the start controlling unit of first control unit is instructed to restart by the start method instructing unit of the second control unit, the start controlling unit of first control unit restarts the first control unit with the second start method instructed by the start method instructing unit of the second control unit.

2. Electronic equipment comprising a plurality of control units that can start themselves independently of each other, each of the control units including:
   a start controlling unit that starts the control unit with one of a first start method and a second start method;
   a judging unit that judges a start method of the control unit; and
   a start method instructing unit that instructs a start method to other control units, wherein:
   the start method instructing unit of a first control unit among the control units instructs a second control unit among the control units to start the second control unit with the second start method when the second start method is judged by the judging unit of the first control unit,
   when a start method is instructed by the start method instructing unit of the second control unit, the start controlling unit of the first control unit starts the first control unit with the start method instructed by the start method instructing unit of the second control unit,
   the first start method is a hibernation start method in which the control unit is restarted from a state in which the control unit is stopped last time, and the second start method is a normal start method in which the control unit is started from its initial state,
   wherein when a firmware of the control unit is updated, the start controlling unit of the control unit starts the control unit with the second start method the next time.

3. Electronic equipment comprising a plurality of control units that can start themselves independently of each other, each of the control units including
   a start controlling unit that starts the control unit with one of a first start method and a second start method;
   a judging unit that judges a start method of the control unit; and
   a start method instructing unit that instructs a start method to other control units, wherein:
   the start method instructing unit of a first control unit among the control units instructs a second control unit among the control units to start the second control unit with the second start method when the second start method is judged by the judging unit of the first control unit,
   when a start method is instructed by the start method instructing unit of the second control unit, the start controlling unit of the first control unit starts the first control unit with the start method instructed by the start method instructing unit of the second control unit,
   the control unit further includes a memory unit to store therein set information indicating a start method of the control unit,
   the start controlling unit of the control unit starts the control unit in accordance with the set information stored in the memory unit of the control unit, and
   the start method instructing unit of the first control unit sets the set information stored in the memory unit of the second control unit to the second start method.

4. The electronic equipment according to claim 3, wherein the judging unit judges the start method based on the set information stored in the memory unit of the control unit.

5. The electronic equipment according to claim 3, wherein the control units share a single memory unit as the respective memory units of the control units, and
   the single memory unit stores therein the respective start methods of the control units or a start method common to all of the control units.

6. The electronic equipment according to claim 3, further comprising an image forming unit that forms an image under control of the control units.

* * * * *